(12) United States Patent
Liu et al.

(10) Patent No.: US 8,766,504 B2
(45) Date of Patent: Jul. 1, 2014

(54) ELECTRIC MOTOR

(75) Inventors: Bao Ting Liu, Shenzhen (CN); Ji Cheng Pan, Shenzhen (CN); Ji Dong Chai, Shenzhen (CN); Guo Dong Zhang, Shenzhen (CN)

(73) Assignee: Johnson Electric S.A., Murten (CH)

( * ) Notice: Subject to any disclaimer, the term of this patent is extended or adjusted under 35 U.S.C. 154(b) by 432 days.

(21) Appl. No.: 13/092,579

(22) Filed: Apr. 22, 2011

(65) Prior Publication Data

US 2011/0260573 A1    Oct. 27, 2011

(30) Foreign Application Priority Data

Apr. 23, 2010   (CN) .......................... 2010 1 0159632

(51) Int. Cl.
*H02K 3/00*        (2006.01)
(52) U.S. Cl.
USPC ........................................ 310/198; 310/184
(58) Field of Classification Search
USPC .................... 310/158, 198, 184–186
See application file for complete search history.

(56) References Cited

U.S. PATENT DOCUMENTS

| | | | | |
|---|---|---|---|---|
| 3,733,506 A * | 5/1973 | Jaffe et al. | ...................... | 310/198 |
| 4,053,801 A * | 10/1977 | Ray et al. | ............... | 310/216.017 |
| 4,217,513 A * | 8/1980 | Kohzai et al. | ................. | 310/186 |
| 5,015,905 A * | 5/1991 | Koharagi et al. | ............. | 310/186 |
| 5,045,742 A * | 9/1991 | Armstrong et al. | .... | 310/216.069 |
| 7,078,843 B2 * | 7/2006 | Du et al. | ................ | 310/216.091 |
| 7,557,484 B2 * | 7/2009 | Kawashima et al. | ......... | 310/225 |
| 8,193,673 B2 * | 6/2012 | Zhao et al. | .................... | 310/198 |
| 2011/0012469 A1 * | 1/2011 | Zhao et al. | .................... | 310/195 |

* cited by examiner

*Primary Examiner* — Dang Le

(74) *Attorney, Agent, or Firm* — Muncy, Geissler, Olds & Lowe, P.C.

(57) ABSTRACT

An electric motor has a rotor, a stator and brushes. The rotor has a shaft, a rotor core fixed to the shaft and having a plurality of teeth, a commutator fixed to the shaft adjacent the rotor core and having a plurality of segments, and rotor winding units wound about the teeth and connected to the commutator segments. Each of the rotor winding units is connected to a pair of adjacent commutator segments. At least one of the rotor winding units has at least two coils connected in series. Each coil has at least two subcoils directly connected in series and separated from each other by at least one tooth. An initial subcoil and a final subcoil of each coil are respectively connected to a pair of segments.

15 Claims, 4 Drawing Sheets

| bar | first subcoil | | second subcoil | | bar | first subcoil | | second subcoil | | bar | first subcoil | | second subcoil | | bar | first subcoil | | second subcoil | | bar |
|---|---|---|---|---|---|---|---|---|---|---|---|---|---|---|---|---|---|---|---|---|
| | slot in | slot out | slot in | slot out | | slot in | slot out | slot in | slot out | | slot in | slot out | slot in | slot out | | slot in | slot out | slot in | slot out | |
| Z1 | S5 | S1 | S6 | S2 | Z19 | S14 | S10 | S15 | S11 | Z2 | S6 | S10 | S7 | S11 | Z20 | S15 | S1 | S16 | S2 | Z3 |
| Z3 | S6 | S2 | S7 | S3 | Z21 | S15 | S11 | S16 | S12 | Z4 | S7 | S11 | S8 | S12 | Z22 | S16 | S2 | S17 | S3 | Z5 |
| Z5 | S7 | S3 | S8 | S4 | Z23 | S16 | S12 | S17 | S13 | Z6 | S8 | S12 | S9 | S13 | Z24 | S17 | S3 | S18 | S4 | Z7 |
| Z7 | S8 | S4 | S9 | S5 | Z25 | S17 | S13 | S18 | S14 | Z8 | S9 | S13 | S10 | S14 | Z26 | S18 | S4 | S1 | S5 | Z9 |
| Z9 | S9 | S5 | S10 | S6 | Z27 | S18 | S14 | S1 | S15 | Z10 | S10 | S14 | S11 | S15 | Z28 | S1 | S5 | S2 | S6 | Z11 |
| Z11 | S10 | S6 | S11 | S7 | Z29 | S1 | S15 | S2 | S16 | Z12 | S11 | S15 | S12 | S16 | Z30 | S2 | S6 | S3 | S7 | Z13 |
| Z13 | S11 | S7 | S12 | S8 | Z31 | S2 | S16 | S3 | S17 | Z14 | S12 | S16 | S13 | S17 | Z32 | S3 | S7 | S4 | S8 | Z15 |
| Z15 | S12 | S8 | S13 | S9 | Z33 | S3 | S17 | S4 | S18 | Z16 | S13 | S17 | S14 | S18 | Z34 | S4 | S8 | S5 | S9 | Z17 |
| Z17 | S13 | S9 | S14 | S10 | Z35 | S4 | S18 | S5 | S1 | Z18 | S14 | S18 | S15 | S1 | Z36 | S5 | S9 | S6 | S10 | Z1 |

FIG. 4

ELECTRIC MOTOR

CROSS REFERENCE TO RELATED APPLICATIONS

This non-provisional patent application claims priority under 35 U.S.C. §119(a) from Patent Application No. 201010159632.4 filed in The People's Republic of China on Apr. 23, 2010.

FIELD OF THE INVENTION

This invention relates to an electric motor and in particular, to a wound rotor of an electric motor.

BACKGROUND OF THE INVENTION

A single phase series motor is also known as a universal motor as it can operate on either AC or DC power. It is a single phase motor with a wound stator and a wound rotor whose rotor windings are connected in series with stator windings via brushes. Due to its characteristics of high rotating speed, small size, low weight, high starting torque, convenient speed regulation and series excitation, the universal motor is commonly used for driving low power appliances that need a high rotating speed, small size and low weight, such as food mixers, vacuum cleaners, domestic sewing machines, power tools and so on.

Referring to FIG. 5 and FIG. 6, a typical known universal motor includes a rotor and a stator. The rotor has a shaft 22, a commutator (not shown) fixed on the shaft, a rotor core 24 which is fixed on the shaft adjacent the commutator and has a plurality of rotor poles 26, and rotor windings (not shown) which are wound about the rotor poles and connected to the commutator. The stator has a stator core 42 which includes a yoke with a rectangular configuration and two teeth 43 (stator poles) which extend inwardly from two opposing sides of the yoke and have stator windings 44 wound thereon. The motor also includes brushes (not shown) in sliding contact with the commutator to transmit electricity to the rotor windings. When the stator windings are electrified, two magnetic poles with opposite polarity are formed at the stator poles and two magnetic circuits are formed. Each magnetic circuit passes through the two stator poles, a half of the rotor and a side of the yoke so that it has a relatively long path, as shown in FIG. 6. Furthermore, both ends of each rotor winding are commonly connected to two segments of the commutator. Commutation performance of the motor is not good, especially when the number of turns of the rotor windings is relatively large.

Hence there is a desire for an improved electric motor.

SUMMARY OF THE INVENTION

Accordingly, the present invention provides an electric motor comprising: a rotor having a shaft, a rotor core fixed to the shaft and having a plurality of teeth, a commutator fixed to the shaft adjacent the rotor core and having a plurality of segments, and rotor winding units wound about the teeth and connected to the segments; a stator magnetically coupled to the rotor; and brushes arranged to be in sliding electrical contact with the commutator; wherein each of the rotor winding units is connected to a pair of adjacent segments and at least one of the rotor winding units comprises at least two coils connected in series; and each said coil comprises at least two subcoils directly connected in series and separated from each other by at least one tooth, and an initial subcoil and a final subcoil of the coil are respectively connected to a pair of segments.

Preferably, the stator is configured to form 2P magnetic poles, the commutator has m segments $Z_1 \sim Z_m$, and the rotor core has n teeth, wherein P is an integer greater than 1, and m and n are even integers greater than P.

Preferably, the rotor has m rotor winding units $R_1 \sim R_m$ and each rotor winding unit $R_k$ is connected to a pair of adjacent segments $Z_k$ and $Z_{k+1}$, is composed of P+1 coils when k is an integer multiple of m/P and is composed of P coils when k is not an integer multiple of m/P, wherein $1 \le k \le m-1$.

Preferably, for $k \ne m/P$, a pair of segments connected by each coil of a rotor winding unit $R_k$ are substantially under the same polarity.

Preferably, a rotor winding unit $R_m$ connected to a pair of adjacent segments $Z_m$ and $Z_1$ is composed of P−1 coils.

Preferably, for $1 \le k \le m/P-1$, the coils of the rotor winding unit $R_k$ have a same winding direction.

Preferably, for $1 \le k \le (m/P-2)$, rotor winding units $R_k$ and $R_{k+2}$ have a same winding direction and rotor winding units $R_k$ and $R_{k+1}$ have opposite winding directions.

Preferably, the ratio of the number of segments to the number of teeth is 1, 2 or 3.

Preferably, each said coil comprises two subcoils directly connected in series and separated from each other by one tooth.

Preferably, the at least two subcoils have a same winding direction.

Preferably, the stator comprises a stator core having a yoke which comprises at least two first sections with two primary poles extending there from and at least two second sections with two auxiliary poles extending there from, the at least two primary poles and the at least two auxiliary poles being alternately arranged in the circumferential direction of the stator core, and the at least two primary poles having stator windings wound thereon; and wherein the stator windings are configured such that, when electrified, at least two primary magnetic poles with the same polarity are formed at the at least two primary poles and at least two induced magnetic poles with the same polarity which is opposite to the polarity of the primary magnetic poles are formed at the at least two auxiliary poles.

Preferably, there is no stator winding wound about the auxiliary poles.

Alternatively, the auxiliary poles have stator windings wound thereon, and the stator windings wound on the auxiliary poles have less number of turns than the stator windings wound on the primary poles.

Preferably, the first sections of the yoke are narrower than the second sections of the yoke.

Preferably, the ratio of an outer diameter of the rotor to a minimum outer size of the stator is greater than 7:10.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

FIG. 4 is a table illustrating the winding pattern of FIG. 3;

DETAILED DESCRIPTION OF THE PREFERRED EMBODIMENT

Figure 1:
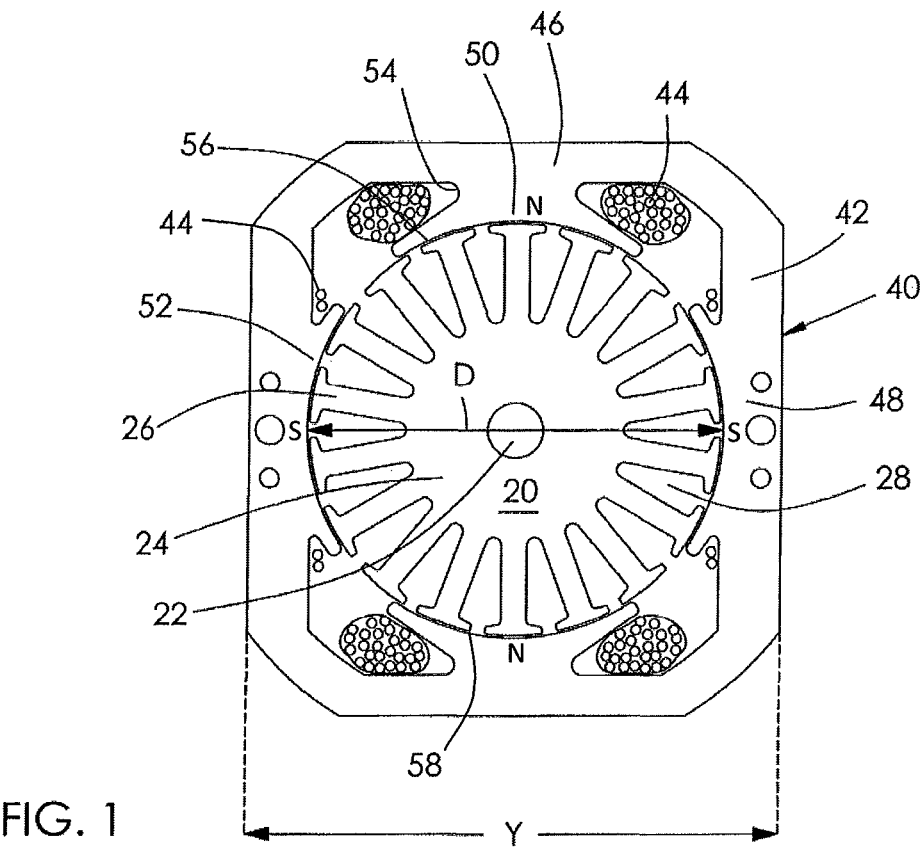
FIG. 1 is a schematic sectional view of an electric motor according to a preferred embodiment of the present invention.

A single phase series motor according to a preferred embodiment of the present invention is shown in FIG. 1. FIG. 1 is a schematic view of a cross section of the motor, with the rotor windings omitted. The motor comprises a rotor 20 and a stator 40 magnetically coupled to the rotor 20.

The rotor 20 comprises a shaft 22, a rotor core 24 fixed on the shaft 22, and a commutator (not shown) fixed on the shaft 22 adjacent the rotor core 24. The rotor core 24 is formed by stacking laminations in the axial direction of the rotor. The rotor core 24 has n teeth 26 and there are m rotor winding units 36 wound about the teeth 26. A winding slot 28 is formed between each two adjacent teeth 26. The commutator has m segments (also referred to as bars) 30. The rotor winding units 36 are wound in the winding slots 28 of the rotor core 24 and connected to the segments 30 of the commutator. In this embodiment, m equals to 36 and n equals to 18.

The stator 40 comprises a stator core 42 and stator windings 44. The stator core 42 is formed by stacking laminations in the axial direction of the motor and comprises a yoke with two first sections 46 and two second sections 48. The first sections 46 and second sections 48 are alternately arranged in the circumferential direction of the stator core 42. Two primary poles 50 and two auxiliary poles 52 extend inwardly from the first sections 46 and the second sections 48 respectively. The stator windings 44 are wound about the primary poles 50, and no windings are wound on the auxiliary poles 52. The motor also has two brushes 60 fixed with respect to the stator 40 to make sliding contact with the commutator to transfer electricity to the rotor winding units 36 via the commutator. The stator core 42 is symmetrical. The primary poles 50 and auxiliary poles 52 are salient poles and each comprise a neck 54 extending radially inwardly from the yoke and a pole shoe 56 extending circumferentially from the neck 54. Each pole shoe 56 forms a continuous arced surface (also known as pole face) 58 facing the rotor 20. Together, the pole shoes form an intermittent cylindrical wall.

In the circumferential direction, the necks of the primary poles 50 are narrower than the necks of the auxiliary poles 52. In the radial directions, the first sections 46 are narrower than the second sections 48, and the distance between the first sections 46 and the shoes 56 of the primary poles 50 are greater than the distance between the second sections 48 and the shoes 56 of the auxiliary poles 52. Thus, a larger space is formed between the first sections 46 and the primary poles 50 to accommodate the stator windings 44. It should be understood that the circumferential direction and the radial direction described above are not only for round or cylindrical structures, other shapes such as square and oval are also included within the scope of the present invention.

Figure 2:
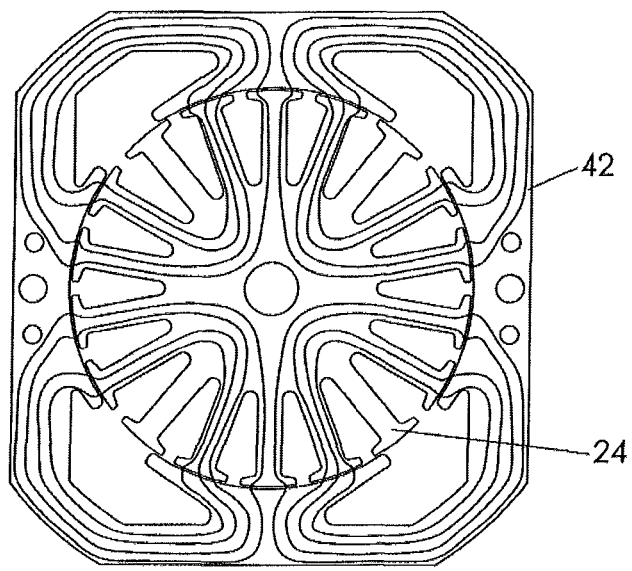
FIG. 2 is a magnetic path diagram for the motor of FIG. 1.

When the stator windings 44 are electrified, two primary magnetic poles with the same polarity (North shown in FIG. 1 for example) are formed at the pole faces 58 of the two primary poles 50 by the stator windings 44 and two induced magnetic poles with the same polarity (South shown in FIG. 1 for example) which is opposite to the polarity at the pole faces 58 of the primary magnetic poles are formed at the pole faces 58 of the two auxiliary poles 52. That is, four magnetic poles and four magnetic paths are formed, as shown in FIG. 2. Each magnetic path passes through a primary pole 50, the stator yoke, an auxiliary pole 52, the air gap between the auxiliary pole 52 and the rotor 20, the rotor 20 and the air gap between the primary pole 50 and the rotor 20.

In the embodiment, the rotor 20 has an outer diameter D, the stator 40 has a minimum outer dimension Y, and the ratio of the outer diameter D to the minimum outer dimension Y is greater than 7:10. The outer diameter of the rotor 20 means the outer diameter of the rotor core 24. The minimum outer dimension of the stator 40 means the distance between two intersection points between a straight line extending through the center of the stator 40 and the periphery of the stator core 42.

The outer diameter D of the rotor 20 is slightly less than the diameter of a circle defined by the arced surfaces of the pole shoes of the poles 50 and 52, and the ratio of the diameter of the circle to the minimum outer diameter of the rotor 20 is also greater than 7:10. It should be understandable that the distance between the primary poles 50 and the rotor core 42 may be equal to or different from the distance between the auxiliary poles 52 and the rotor core 42. When the two distances are different, the arced surfaces of the shoes of the primary poles 50 and the arced surfaces of the shoes of the auxiliary poles 52 define two circles with different diameters. In this configuration, the diameter of the circle means the diameter of the smaller circle.

In the preferred embodiment, the auxiliary poles 52 projects inwardly from the inner side of the second sections 48 so as to be formed as salient poles. Alternatively, the auxiliary poles 52 may be formed as non-salient poles which are sunk relative to the inner side of the second sections 48. When the auxiliary poles 52 are salient poles, as shown in FIG. 1, they may also have stator windings 44 wound thereon, and the stator windings 44 wound on the auxiliary poles 52 have less turns than the stator windings 44 wound on the primary poles 50.

The preferred winding pattern of the rotor winding units in the present invention will be now generally described. To simplify the description, segments (or bars) 30 of the commutator are represented by $Z_1 \sim Z_m$, winding slots 28 of the rotor core 24 are represent by $S_1 \sim S_n$, rotor winding units 36 of the rotor 20 are represented by $R_1 \sim R_m$, and the number of stator magnetic poles is 2P. Bar $Z_k$ is electrically connected with bar $Z_{k+1}$ via a rotor winding unit $R_k$. When k is not an integer multiple of m/P, the rotor winding unit $R_k$ is composed of P coils connected in series. When k is an integer multiple of m/P, the rotor winding unit $R_k$ is composed of P+1 coils connected in series. Bar $Z_m$ is electrically connected with bar $Z_1$ adjacent the bar $Z_m$ via a rotor winding unit $R_m$ which is composed of a single coil. Each coil $W_i$ of the rotor winding units 36 is connected to two bars 30 and comprises a first subcoil $W_{ia}$ and a second subcoil $W_{ib}$ which is directly connected in series with the first subcoil $W_{ia}$ and separated from the first subcoil $W_{ia}$ by at least one tooth. Two subcoils of each coil have a same winding direction, which also means the winding direction of the coil. The first subcoil $W_{ia}$ and the second subcoil $W_{ib}$ are connected to the two bars respectively. Preferably, the tooth number q, being the number of teeth about which the subcoil is wound, of the first subcoil $W_{ia}$ is equal to that of the second subcoil $W_{ib}$. The tooth number q is an integer meeting the expression: $|q-n/2P|<1$, wherein n/2P is the pole pitch. In above description, P is an integer greater than 1, m and n are even integers greater than P, $1 \leq k \leq m-1$, and $1 \leq i \leq m$. Preferably, the ratio of m to n is 2, q is an integer less than n/2P, and the ratio of m to n may be 1, 2, or 3.

When k is not an integer multiple of m/P, the rotor winding unit Rk connected to bars $Z_k$ and $Z_{k+1}$, passes around the circumference of the rotor core 24 and is composed of P coils connected in series. Two bars connected by each coil are substantially under the same polarity. In the present, two or more bars under the same polarity means that the two or more bars are separated from each other by the distance between poles of the same polarity. As is known, for a motor having 2P stator magnetic poles and a commutator of m bars, the distance between poles of the same polarity measured in the number of bars is equal to m/P. In the preferred embodiment, P equals to 2 and m/P equals to 18. Each rotor winding unit $R_k$ is composed of two coils which are connected in series to bars $Z_k$ and $Z_{k+1}$. The two coils are also connected to a shared bar $Z_y$, wherein $1 \leq y \leq m$ and y meets the expression of $|k-y|=m/P$ or $|k+1-y|=m/P$.

When k is an integer multiple of m/P, the rotor winding unit Rk is composed of P+1 coils connected in series. Each of the first P coils is connected to two bars substantially under the same polarity and the final coil is connected to two bars adjacent to each other.

Figure 3:
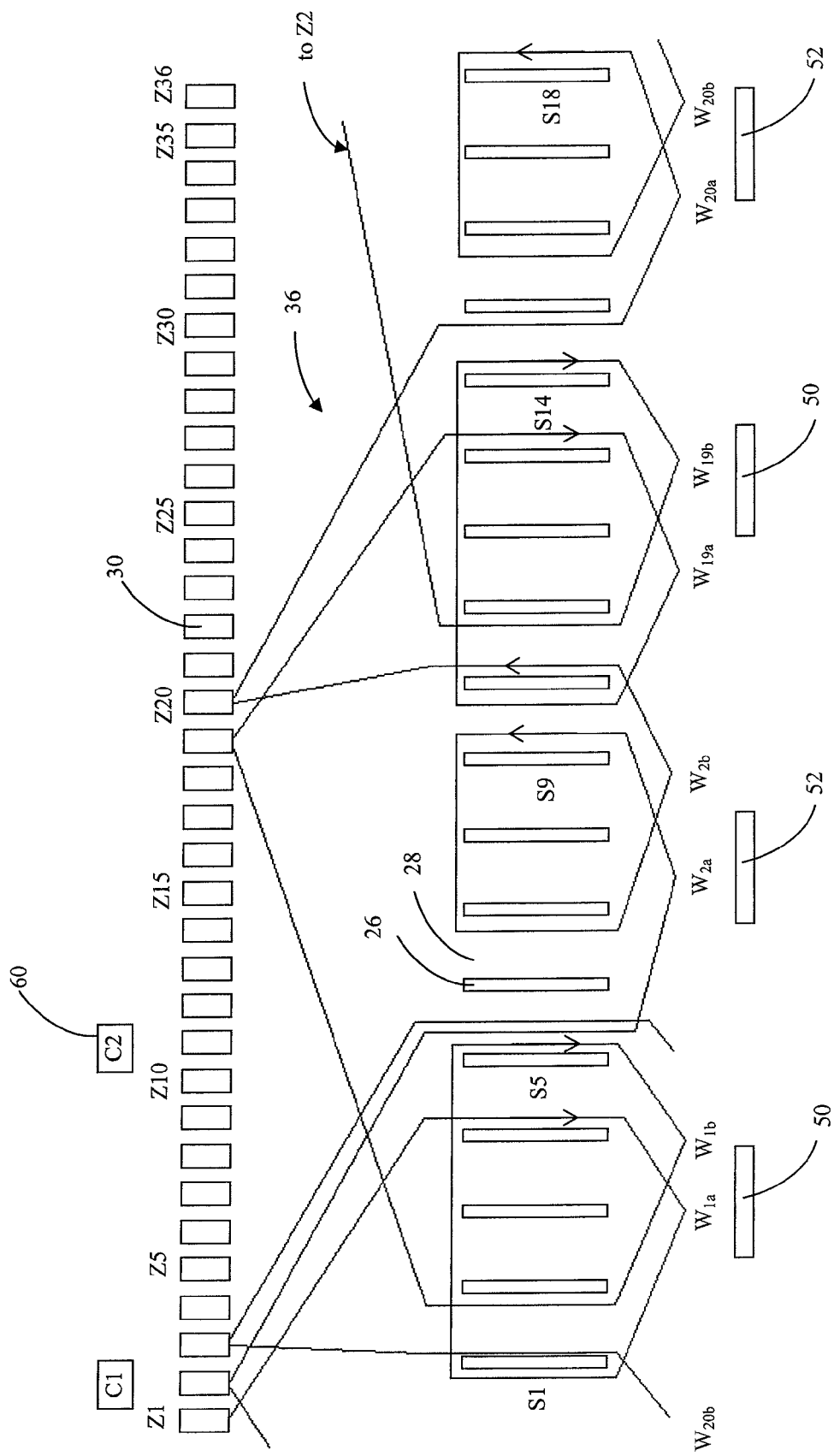
FIG. 3 shows a simplified winding pattern diagram for the motor of FIG. 1.
Figure 5:
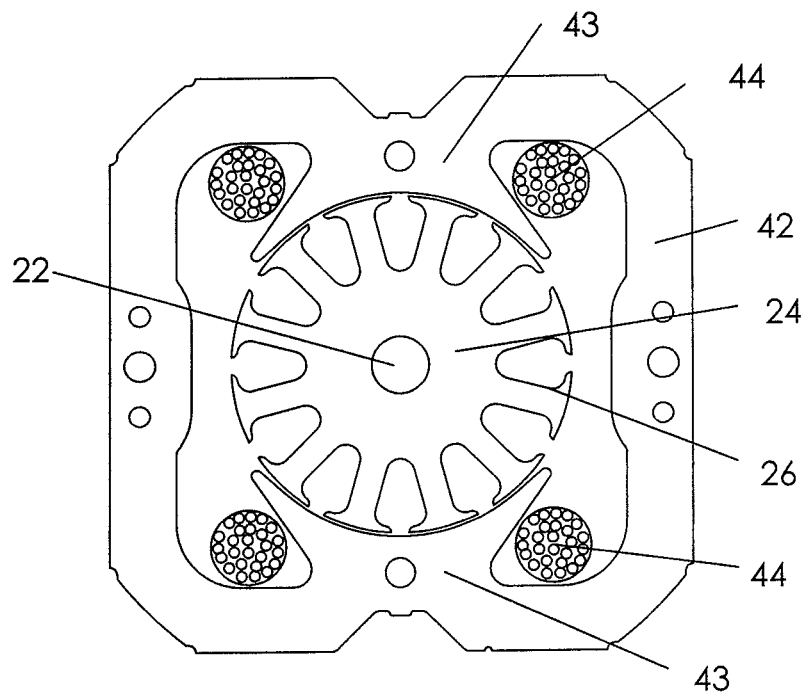
FIG. 5 is a schematic sectional view of a conventional universal motor.
Figure 6:
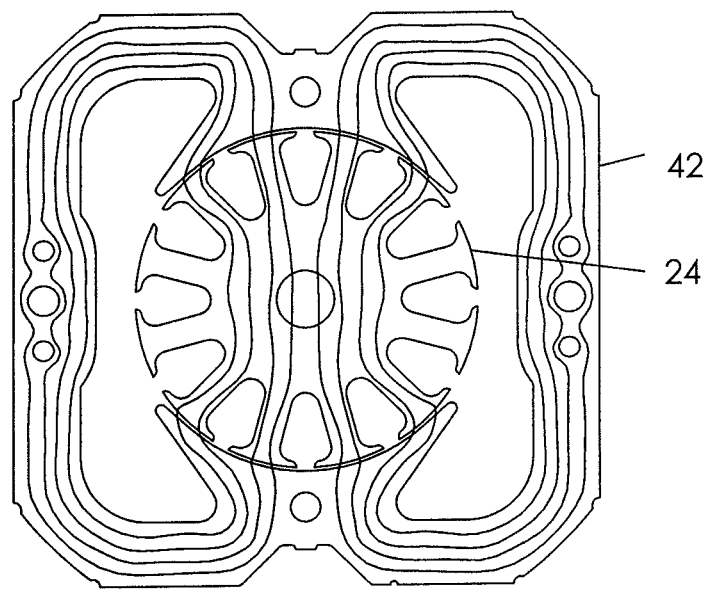
FIG. 6 is a magnetic path diagram for the motor of FIG. 5.

Now referring to FIG. 3 and FIG. 4, the winding pattern of the rotor winding units in the preferred embodiment will be described in detail. FIG. 3 is a winding diagram in which, the top row represents two brushes $C_1$ and $C_2$ supported by the stator, the second row represents the thirty-six segments $Z_1$~$Z_{36}$ of the commutator, the third row represents the eighteen teeth of the rotor core and eighteen winding slots $S_1$~$S_{18}$ formed by the teeth, and the fourth row represents the four poles of the stator. FIG. 4 is a table illustrating winding pattern of the rotor winding units in which, "slot in" mean a first winding slot that each subcoil of a coil is wound in, and "slot out" means a second winding slot that the subcoil is wound in, viewed in the winding direction of the coil.

Bar $Z_1$ is electrically connected to bar $Z_2$ via a rotor winding unit $R_1$ which is composed of two coils $W_1$ and $W_{19}$. The two coils $W_1$ and $W_{19}$ are also connected to a shared bar $Z_{19}$ which is under the same polarity as bar $Z_1$. The coil $W_1$ is connected to bars $Z_1$ and $Z_{19}$ while the coil $W_{19}$ is connected to bars $Z_{19}$ and $Z_2$. The coil $W_1$ has the same winding direction as the coil $W_{19}$, both in clockwise direction as shown in FIG. 3. The first subcoil $W_{1a}$ of the coil $W_1$ is wound about the teeth between the winding slots $S_5$ and $S_1$, and the second subcoil $W_{1b}$ of the coil $W_1$ is wound about the teeth between the winding slots $S_6$ and $S_2$. The first subcoil $W_{19a}$ of the coil $W_{19}$ is wound about the teeth between the winding slots $S_{14}$ and $S_{10}$, and the second subcoil $W_{19b}$ of the coil $W_{19}$ is wound about the teeth between the winding slots $S_{15}$ and $S_{11}$.

Bar $Z_2$ is electrically connected to bar $Z_3$ via a rotor winding unit $R_2$ which is composed of two coils $W_2$ and $W_{20}$. The two coils $W_2$ and $W_{20}$ are also connected to a shared bar $Z_{20}$ which is under the same polarity as bar $Z_2$. The coil $W_2$ is connected to bars $Z_2$ and $Z_{20}$ while the coil $W_{20}$ is connected to bars $Z_{20}$ and $Z_3$. The coil $W_2$ has the same winding direction as the coil $W_{20}$, but opposite to the winding direction of the coils $W_1$ and $W_{19}$. The first subcoil $W_{2a}$ of the coil $W_2$ is wound about the teeth between the winding slots $S_6$ and $S_{10}$, and the second subcoil $W_{2b}$ of the coil $W_2$ is wound about the teeth between the winding slots $S_7$ and $S_{11}$. The first subcoil $W_{20a}$ of the coil $W_{20}$ is wound about the teeth between the winding slots $S_{15}$ and $S_1$, and the second subcoil $W_{20b}$ of the coil $W_{20}$ is wound about the teeth between the winding slots $S_{16}$ and $S_2$.

Similar to the electrical connection of bars $Z_1$ and $Z_2$, bar $Z_3$ is electrically connected to bar $Z_4$ via a rotor winding unit $R_3$ which is composed of two coils $W_3$ and $W_{21}$. The two coils $W_3$ and $W_{21}$ are also connected to a shared bar $Z_{21}$ which is under the same polarity as bar $Z_3$. The coil $W_3$ is connected to bars $Z_3$ and $Z_{21}$ while the coil $W_{21}$ is connected to bars $Z_{21}$ and $Z_4$. Like the coils $W_1$ and $W_{19}$, the coils $W_3$ and $W_{21}$ are also wound in clockwise direction. The first subcoil $W_{3a}$ of the coil $W_3$ is wound about the teeth between the winding slots $S_6$ and $S_2$, and the second subcoil $W_{3b}$ of the coil $W_3$ is wound about the teeth between the winding slots $S_7$ and $S_3$. The first subcoil $W_{21a}$ of the coil $W_{21}$ is wound about the teeth between the winding slots $S_{15}$ and $S_{11}$, and the second subcoil $W_{21b}$ of the coil $W_{21}$ is wound about the teeth between the winding slots $S_{16}$ and $S_{12}$.

Similar to the electrical connection of bars $Z_2$ and $Z_3$, bar $Z_4$ is electrically connected to bar $Z_5$ via a rotor winding unit $R_4$ which is composed of two coils $W_4$ and $W_{22}$. The two coils $W_4$ and $W_{22}$ are also connected to a shared bar $Z_{22}$ which is under the same polarity as bar $Z_4$. The coil $W_4$ is connected to bars $Z_4$ and $Z_{22}$ while the coil $W_{22}$ is connected to bars $Z_{22}$ and $Z_5$. Like the coils $W_2$ and $W_{20}$, the coil $W_4$ and $W_{22}$ are wound in counter-clockwise direction. The first subcoil $W_{4a}$ of the coil $W_4$ is wound about the teeth between the winding slots $S_7$ and $S_{11}$, and the second subcoil $W_{4b}$ of the coil $W_4$ is wound about the teeth between the winding slots $S_8$ and $S_{12}$. The first subcoil $W_{22a}$ of the coil $W_{22}$ is wound about the teeth between the winding slots $S_{16}$ and $S_2$, and the second subcoil $W_{22b}$ of the coil $W_{22}$ is wound about the teeth between the winding slots $S_{17}$ and $S_{13}$. And so on.

The winding pattern of the rotor winding units in the preferred embodiment may be summarized as follows.

1) For $1 \leq k \leq 35$ and $k \neq m/P$ or 18, rotor winding unit Rk connected to bar $Z_k$ and bar $Z_{k+1}$ is composed of two coils connected in series. The two coils are also connected to a shared bar $Z_y$ which is under the same polarity as bar $Z_k$. When $1 \leq k \leq 17$, y is equal to k+m/P or k+18, and when $19 \leq k \leq 35$, y is equal to k−(m/P−1) or k−17. The first subcoil of each coil of each rotor winding unit $R_k$ is wound around the same tooth number q as the second subcoil of the coil wherein q is an integer meeting the expression of $|q-n/2P|<1$, that is 4 or 5 in the embodiment. Preferably, q is equal to 4 so as to reduce the consumption of winding material. On the other hand, for $1 \leq k \leq (m/P-1)$, the two coils of the rotor winding unit $R_k$ have the same winding direction and are separated from each other by n/P or 9 tooth. For $1 \leq k \leq (m/P-2)$, $R_{k+2}$ and $R_k$ have the same winding direction and are separated from each other by one tooth, and $R_{k+1}$ and $R_k$ have opposite winding directions and are separated from each other by one tooth. With forming of the rotor winding units $R_1$~$R_{17}$, rotor winding units $R_{19}$~$R_{35}$ are also formed. This is preferably achieved by using a double fly winding machine.

2) For k equal to m or 36, rotor winding unit $R_{36}$ connected to bars $Z_{36}$ and $Z_1$ is composed of one coil $W_{36}$. The first subcoil $W_{36a}$ of the coil $W_{36}$ is wound about the teeth between the winding slots $S_5$ and $S_9$, and the second subcoil $W_{36b}$ of the coil $W_{36}$ is wound about the teeth between the winding slots $S_6$ and $S_{10}$.

3) For k equal to m/P or 18, rotor winding unit $R_{18}$ connected to bars $Z_{18}$ and $Z_{19}$ is composed of three coils in which the first coil $W_{18}$ is connected to bars $Z_{18}$ and $Z_{36}$, the second coil $W_{36}$ is connected to bars $Z_{36}$ and $Z_1$, and the third coil $W_1$ is connected to bars $Z_1$ and $Z_{19}$. The first subcoil $W_{18a}$ of the coil $W_{18}$ is wound about the teeth between the winding slots $S_{14}$ and $S_{18}$, and the second subcoil $W_{18b}$ of the coil $W_{18}$ is wound about the teeth between the winding slots $S_{15}$ and $S_1$. The other two coils $W_{36}$ and $W_1$ have been described above and are not described again here.

Preferably, the first subcoil of each coil has the same number of turns (also referred to as the turn number) as the second subcoil of the coil. Alternatively, the second subcoil may have a different turn number compared to the first subcoil.

In the conventional universal motor, each pair of commutator segments are connected to each other via a coil with a single subcoil, the induction electromotive force generated in the commutating coil is in direct proportion to the square of total number x of turns of the rotor winding unit. In the present invention, almost every pair of segments are connected to each other via a coil with two or more subcoils, and the induced electromotive force generated in the commutating coil is in direct proportion to $(x_1^2+x_2^2)$ wherein $x_1$ and $x_2$ are turn numbers of the two subcoils respectively. Provided that x equals to $(x_1+x_2)$, the induction electromotive force in the commutating coil in the present invention is smaller, therefore commutation performance can be improved and the expected life of the motor can be increased. Moreover, as two subcoils of each coil connected to two segments are wound about more winding slots, the initial winding imbalance in the winding process can be reduced.

Furthermore, in embodiments of the present invention, as each flux circuit passes through adjacent primary stator pole and auxiliary stator pole, the flux path is reduced and optimized. Thus, the universal motor of the present invention may have a reduced stator core and windings material compared with a known universal motor with the same output, whereby saving cost.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, the number of brushes of the motor are not limited to two. Each rotor winding unit may comprises more than two subcoils, and subcoils of a same rotor winding unit may have different numbers of turns.

The invention claimed is:

1. An electric motor comprising:
a rotor having a shaft, a rotor core fixed to the shaft and having a plurality of teeth, a commutator fixed to the shaft adjacent the rotor core and having a plurality of segments, and rotor winding units wound about the teeth and connected to the segments;
a stator magnetically coupled to the rotor; and
brushes arranged to be in sliding electrical contact with the commutator;
wherein each of the rotor winding units has two ends connected to a pair of segments next to each other and at least one of the rotor winding units comprises at least two coils connected in series; and
each said coil comprises at least two subcoils directly connected in series and offset from each other by at least one tooth, and an initial subcoil and a final subcoil of the coil are respectively connected to a pair of segments.

2. The motor of claim 1, wherein the stator is configured to form 2P magnetic poles, the commutator has m segments $Z_1 \sim Z_m$, and the rotor core has n teeth, wherein P is an integer greater than 1, and m and n are even integers greater than P.

3. The motor of claim 2, wherein the rotor has m rotor winding units $R_1 \sim R_m$ and two ends of each rotor winding unit $R_k$ are connected to a pair of segments $Z_k$ and $Z_{k+1}$ next to each other, is composed of P+1 coils when k is an integer multiple of m/P and is composed of P coils when k is not an integer multiple of m/P, wherein $1 \leq k \leq m-1$.

4. The motor of claim 3, wherein for $k \neq m/P$, a pair of segments connected by each coil of a rotor winding unit $R_k$ are substantially under the same polarity.

5. The motor of claim 3, wherein a rotor winding unit $R_m$ connected to a pair of segments $Z_m$ and $Z_1$ next to each other is composed of P−1 coils.

6. The motor of claim 3, wherein for $1 \leq k \leq m/P-1$, the coils of the rotor winding unit $R_k$ have a same winding direction.

7. The motor of claim 6, wherein for $1 \leq k \leq ((m/P)-2)$, rotor winding units $R_k$ and $R_{k+2}$ have a same winding direction and rotor winding units $R_k$ and $R_{k+1}$ have opposite winding directions.

8. The motor of claim 1, wherein the ratio of the number of segments to the number of teeth is 1, 2 or 3.

9. The motor of claim 1, wherein each said coil comprises two subcoils directly connected in series and the first winding slots of the initial subcoil and the final subcoil of said coil are offset from each other by one tooth.

10. The motor of claim 1, wherein the at least two subcoils directly connected in series have a same winding direction.

11. The motor of claim 1, wherein the stator comprises a stator core having a yoke which comprises at least two first sections with two primary poles extending there from and at least two second sections with two auxiliary poles extending there from, the at least two primary poles and the at least two auxiliary poles being alternately arranged in the circumferential direction of the stator core, each of the primary poles and the auxiliary poles having a pole face facing the rotor, and the at least two primary poles having stator windings wound thereon; and
wherein the stator windings are configured such that, when electrified, at least two primary magnetic poles with a first polarity are formed at the pole faces of the at least two primary poles and at least two induced magnetic poles with a second polarity which is opposite to the first polarity are formed at the pole faces of the at least two auxiliary poles.

12. The motor of claim 11, wherein there is no stator winding wound about the auxiliary poles.

13. The motor of claim 11, wherein the auxiliary poles have stator windings wound thereon, and the stator windings wound on the auxiliary poles have less number of turns than the stator windings wound on the primary poles.

14. The motor of claim 11, wherein the first sections of the yoke are narrower than the second sections of the yoke.

15. The motor of claim 11, wherein the ratio of an outer diameter of the rotor to a minimum outer size of the stator is greater than 7:10.

* * * * *